3,092,065
MULTI-SECTION CLOSING OR LIFT-LOCK DEVICES HAVING RETRACTABLE BEARING MEMBERS
Henri Kummerman, Paris, France, assignor to International MacGregor Organization, a body corporate of Monaco
Filed Dec. 5, 1960, Ser. No. 73,694
Claims priority, application France Jan. 6, 1960
16 Claims. (Cl. 114—202)

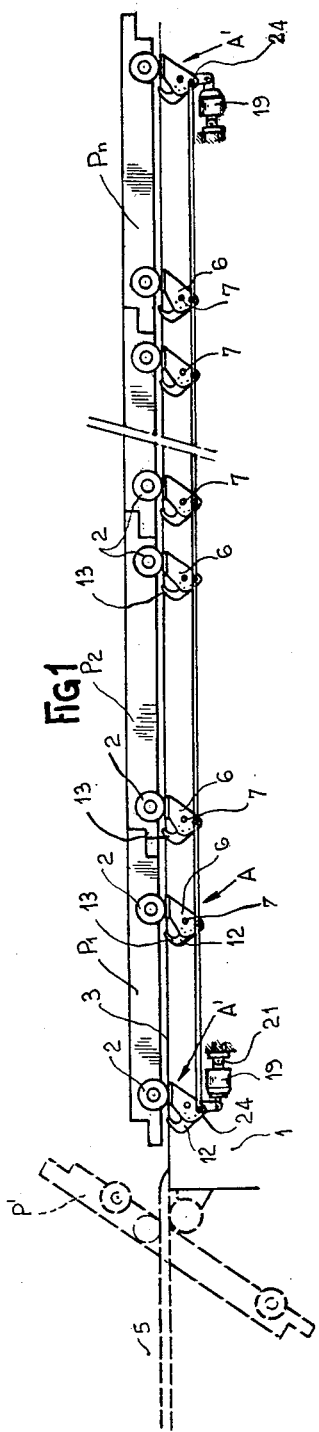

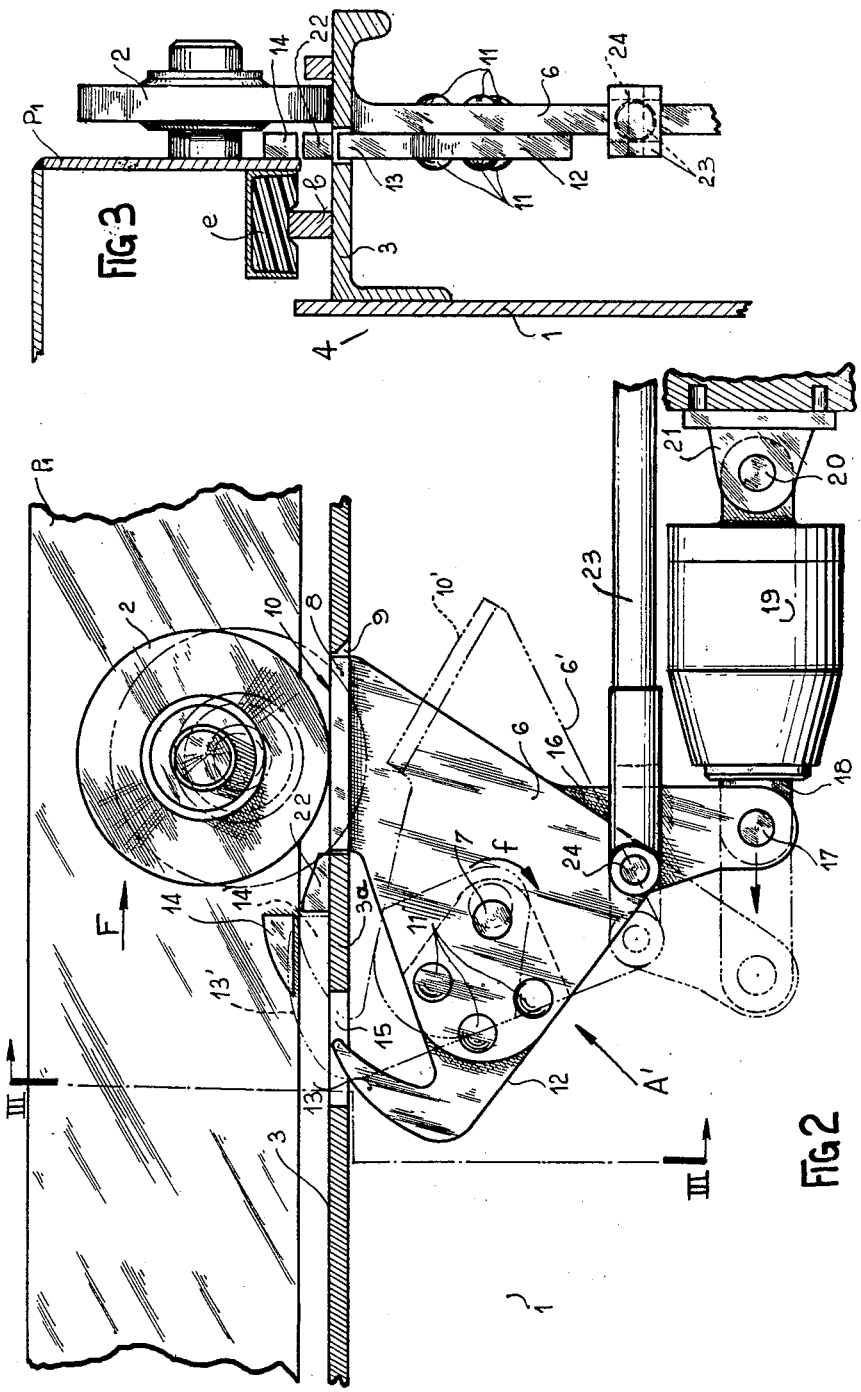

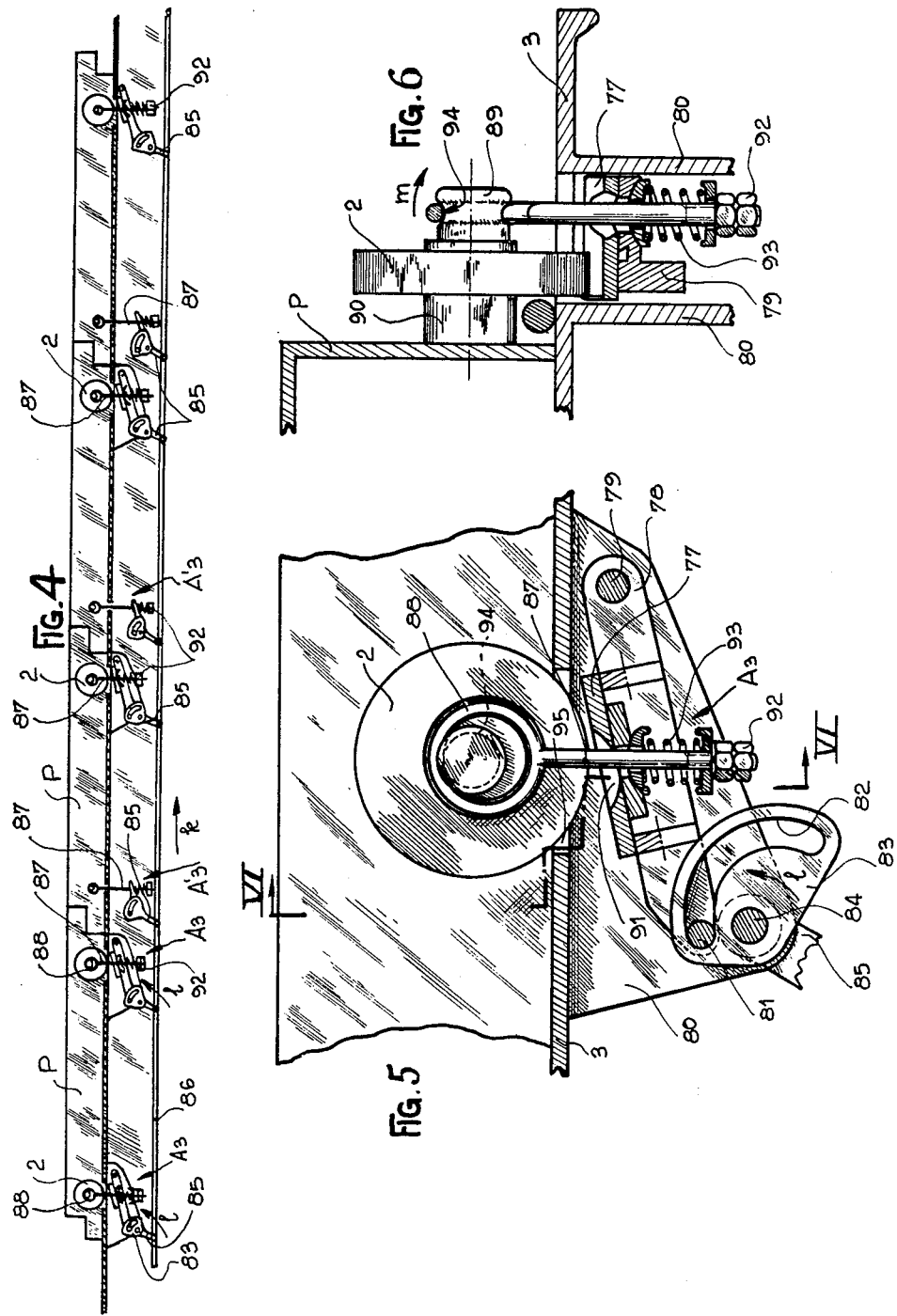

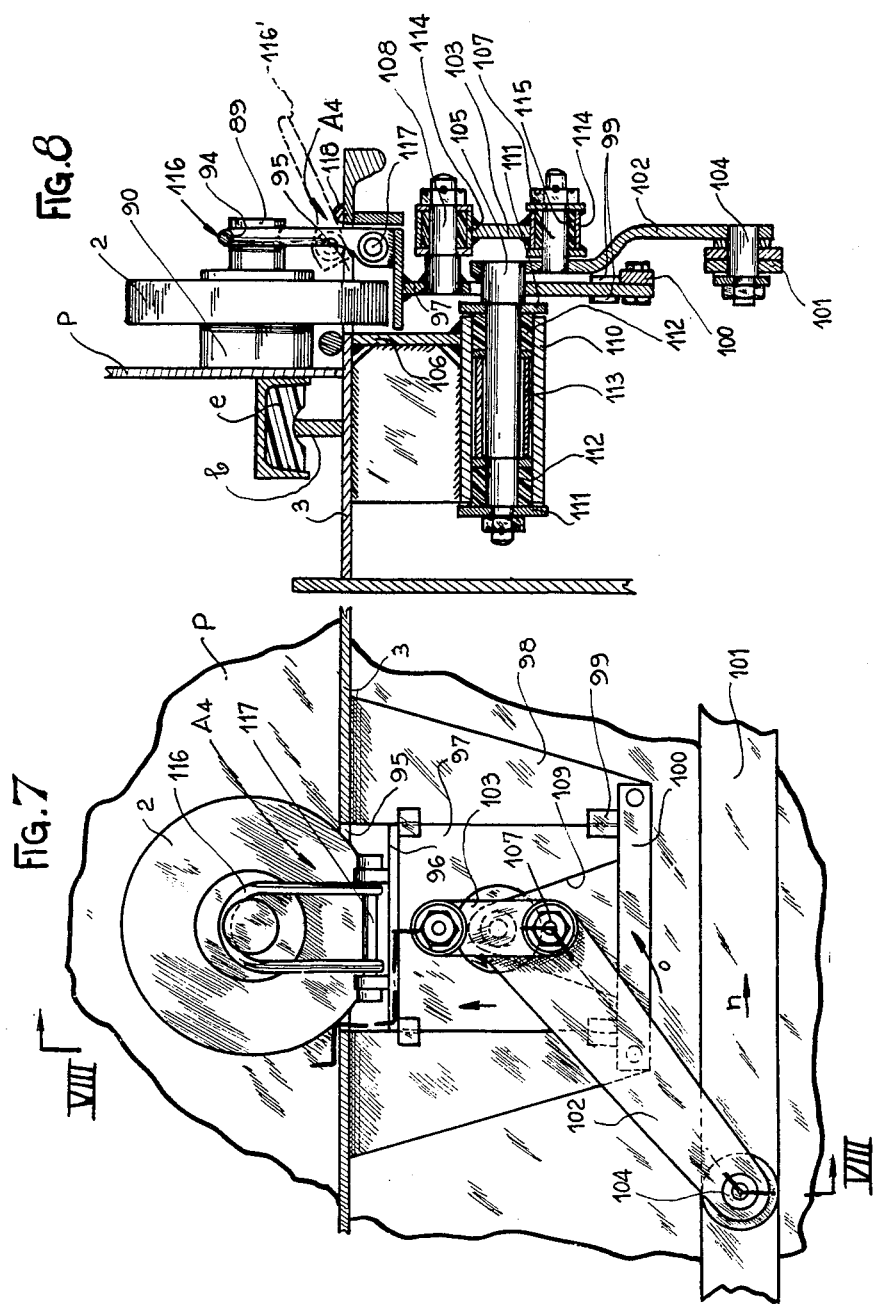

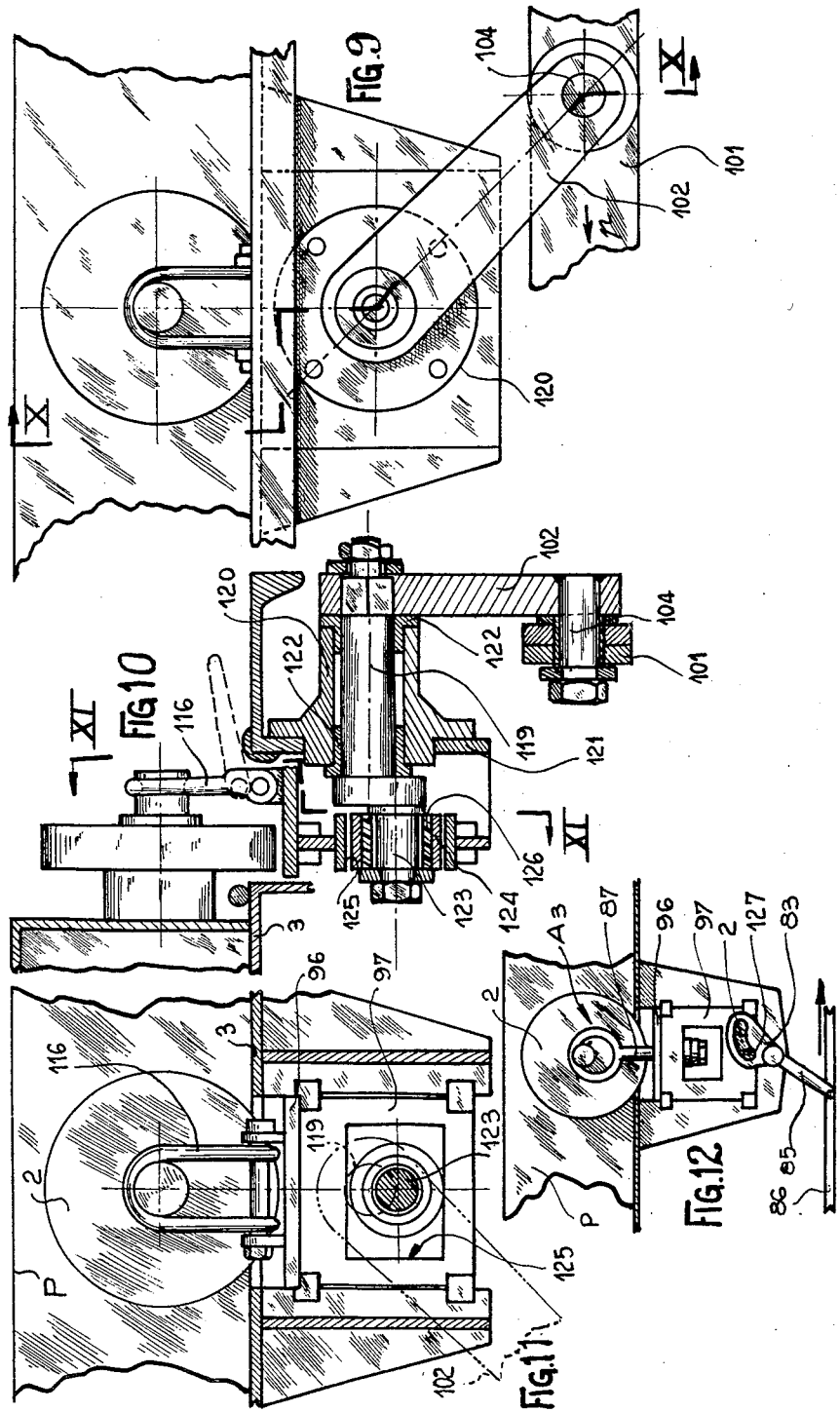

This invention relates in general to devices for closing open spaces, whether fixed or movable, such as sheds, shipholds, vehicles, etc. by means of hingedly interconnected panel elements of the lift-lock or like character and this invention is directed specifically to a method of arranging devices of this general type.

This method is applicable more particularly to lift-lock devices wherein runways or guideways are formed along the edges of the space to be closed with a view to permit the movement of the elements constituting the device by causing these elements to slide or roll to and from a stowing place or space at one or either end of the aperture to be closed.

It is already known to equip these guideways or runways with retractable or collapsible bearing or supporting members co-acting with the closing panels or like elements for lifting or lowering same with a view to cause these elements to bear on or be released from their sealing joints when they are in their closed position, different control or actuator means being provided for producing separately or simultaneously the corresponding movements of these retractable or collapsible bearing members.

When the panels are in their closed position it is advisable, notably in movable installations such as ships and railways, to provide means for preventing any untimely movements of these panels on their runways or guideways, in order to preserve the efficient fluid-tightness of the device at all points along the edges of the aperture. To this end, retaining or locking means are usually provided which are located and tightened after the panels have been lowered and therefore caused to engage their sealing joints or gaskets. This retaining or locking step—which is absolutely necessary in the case of hatchway covers of ship holds—is relatively long and represents therefore a considerable loss of time during both opening and closing operations.

It is therefore the essential object of this invention to provide a method of avoiding this drawback while simplifying considerably the different operations necessary for positioning or on the contrary stowing these panels.

This method is remarkable notably in that retaining or locking means are associated with said bearing members or with the actuating means thereof, said retaining or locking means being on the one hand arranged with a view to hold the panels against movement in their closed position on their runways, and on the other hand controlled through said bearing members or their control means.

As will be made clear presently, the aforesaid retaining or locking means may consist of hooks, latches, bolts, shackles, anchoring pins and the like, mounted on the aforesaid retractable bearing members or on their control means or independently therefrom, and co-acting in the locked position with projections, bolt-clamps, keepers, pins, flanges and the like, provided on the panel elements.

According to a specific and first form of embodiment of this invention, composite members mounted for pivotal or sliding movement are used which constitute for one portion the aforesaid bearing surface or retractable support and for the other portion the retaining or locking member associated therewith.

In practice, a great number of alternate forms of embodiment may be imagined or contemplated from the method broadly set forth hereinabove according to the type of retractable member utilised, and the manner in which these retractable members are controlled. Indeed, these retractable members may consist either of bearing surfaces, plates or the like constituting in their upper position one fraction of the runways on which the panel sections are to travel to and from the stowage space, or of rollers on which the panel sections are caused to bear directly through their lower longitudinal edges. In either case these bearing members extend through orifices formed to this end through the edges, runways or guideways of the aperture to be closed, and their inherent movement may be a vertical sliding movement, or a tilting movement about an axis underlying the plane of said runways, or a combination of both movements.

Moreover, these retractable bearing members may be controlled separately for example by means of separate jacks, crank-handles, etc., either simultaneously by means of common actuating rods extending beneath the runways and controlling during their axial movements all the retractable bearing members disposed on the same side of the aperture to be closed. In either case, locking or retaining members may be associated either with the retractable or collapsible bearing members or with their actuating means, so that they may effect movements similar to those accomplished by said retractable or collapsible members, that is, up- and downward movements, simultaneously with these members, or composite movements, possibly of different types and/or directions, in order automatically to lock and press the panel sections against their sealing joints when the retractable or collapsible members are in their lower position, and subsequently releasing, also automatically, these panel sections when the retractable or collapsible members are in their upper position.

This invention is also concerned with a lift-lock device of the type broadly defined hereinabove and comprising movable panel sections for closing open spaces, whether fixed or movable, such as sheds, shipholds, vehicles, etc., this device arranged according to the method set forth hereinabove being remarkable notably in that it comprises retaining or locking means associated with the aforesaid bearing members or their actuating means said retaining or locking means being on the one hand adapted to hold said panel sections against movement in their closed position on their runways, and on the other hand controlled through said bearing members or their control means.

Of course, the separate or simultaneous movements of the different retractable or collapsible bearing members with the locking members associated therewith may be controlled by utilizing to this end any known and conventional means such as separate jacks, motors, crank-handles, etc., or transmission members such as operating rods, cables, chains or other members actuated from a common power device such as a fluid-actuated cylinder, electro-motor, winch, derrick mast, etc.

Finally, this invention relates to fixed or movable installations of any types such as shipholds, sheds, vehicles, etc. of the open-top-type, provided with lift-lock closing devices constructed in accordance with the method broadly defined hereinabove.

Other features and advantages of this invention will appear as the following description proceeds with reference to the accompanying drawings forming part of this specification and illustrating diagrammatically by way of example a few typical forms of embodiment of the invention.

In the drawings:
FIGURE 1 is a diagrammatic elevational section showing a first embodiment of a movable section lift-lock device constructed according to this invention;

FIGURE 2 shows on a larger scale the retractable bearing members acting as locking members in the embodiment of FIGURE 1;

FIGURE 3 is a section taken upon the line III—III of FIGURE 2;

FIGURE 4 is a diagrammatic elevational section showing a different form of embodiment of the lift-lock device of this invention.

FIGURE 5 is a longitudinal section of a detail of the device shown in FIGURE 4;

FIGURE 6 is a section taken upon the line VI—VI of FIGURE 5;

FIGURE 7 is another modified form of embodiment of the device shown in elevational view;

FIGURE 8 is a section taken upon the line VIII—VIII of FIGURE 7;

FIGURE 9 is an elevational view showing another form of embodiment of the device of this invention;

FIGURE 10 is a section taken upon the line X—X of FIGURE 9;

FIGURE 11 is a section taken upon the line XI—XI of FIGURE 10; and

FIGURE 12 illustrates diagrammatically in elevation and on a smaller scale a modified embodiment of the device shown in FIGURE 9.

In the example illustrated in FIGURES 1 to 3 of the drawings a so-called "lift-lock" device adapted to cover or uncover an open-top space 1 such as a shiphold or the like comprises movable panels or sections P1, P2 . . . P$n$ rolling by means of rollers 2 on guideways or runways 3 provided on either side of the top aperture 4 of the space 1. These panels are actuated through conventional or adequate means (not shown) and may be stowed as usual in a complementary stowing space 5 provided at one end of the aperture 4, after having tilted to a vertical position as shown diagrammatically in chain-dotted lines at P′ in FIGURE 1.

The rollers 2 supporting these panels during their movements are positioned—when the set of panels is closed—above the movable devices A, A′ constituting jointly, according to this invention, retractable or collapsible bearing or supporting members and retaining or locking members for the different panels of the set.

As shown more in details in FIGURES 2 and 3, a device A′ consists of an arm or lever 6 pivotally mounted at 7 for example along the edge of the hatch-coaming under the runway 3, and has one end or a flat upper edge 8 adapted to act as a movable bearing or support to the roller 2 of panel P1. This upper edge 8 is adapted, in the position shown in solid lines in FIGURE 2, to engage and fit in a slot or like aperture 9 formed in the runway 3 so that its upper face 10 may lie flush with the plane of this runway and be engaged by the rolling wheel 2.

On the other hand, the arm 6 has secured thereon for example by means of rivets or bolts 11 a member 12 formed at its outer end with a hook 13 adapted in the locking position of the member 6 to co-act with a latch or catch 14 carried by the panel P1. Above the hook 13 the runway 3 has another orifice 15 formed therein so that the hook 13 may move to a position in which it projects above the runway 3 during the panel locking operation.

It will be readily understood that, from the position shown in solid lines in FIGURE 2, the member 6 when pivoting about its fulcrum pin 7 in the direction of the arrow $f$ will move to the position shown at 6′ in broken lines. Its bearing surface 10 is retracted to 10′ and thus the roller 2 is allowed to drop into the orifice 8, thereby causing the panel gaskets $e$ (FIGURE 3) which overlies a sealing rib $b$ running for example along the runways 3, to tightly engage this rib $b$ and prevent the ingress of sea- and rain-water into the space protected by the set of panels.

Simultaneously, the hook 13 is tilted to position 13′ over the catch 14 of panel P1 which has moved to position 14′.

To prevent the panels from moving horizontally in the direction of the arrow F during the locking movement, for example as a consequence of the thrust exerted by the hook 13 against the catch 14, any suitable and known arrangement comprising for example stops, wedges, etc. may be provided for holding each panel such as P1 in the locked position. In the example illustrated a safety stop 22 projecting from the surface of the runway 3 and secured for example on the solid portion 3a of this runway lying between the two orifices 8 and 15 may be provided. This safety stop is so positioned that when the panel P is lowered with respect to the runways the latch or catch 14 engages the stop 22 at 14′.

The different devices A, A′ disposed on the same side of the aperture 4 are actuated preferably by means of a pair of hydraulic jacks 19 disposed at either end of the aperture and adapted to actuate directly, by exerting a pull in opposite directions, the rocking arms 6 of the end devices A′. As shown more in detail in FIG. 2, one jack 19 has one end pivoted at 20 on a fixed support 21 and its piston rod 18 is pivoted by means of a pin 17 on a lug 16 constituting the downward extension of the rocking member 6 of device A′. The rocking members 6 of the other intermediate devices A are interconnected by means of a common actuating rod 23 pivoted at its ends through a pin 24 on the lower portion of the rocking arms 6 of the end devices A′.

Of course, any other adequate and known actuating device may be substituted for the jack 19 and control rod 23; thus, cables or chains may be used to this end, as well as, if desired, a single control jack actuating the rod 23 alternately in one and in the other direction.

In the alternate embodiment shown in FIGURES 4 to 6 of the drawings the panel locking members are mounted directly on the retractable bearing supports. These supports consist of plates 77 carried by rocking arm 78 pivoted at one end by means of pins 79 on a pair of plates or gussets 80 secured in turn under the runway 3 of panels P. At their other ends the rocking arms 78 carry a transverse pin 81 engaging an eccentric curved slot 82 formed in a transmission sector 83 fulcrumed at 84 between the two gussets 80.

These sectors 83 are rotatably driven through links 85 wedged at one of their ends on the pivot pin 84 of sectors 83 and pivoted at their other ends on a control rod 86 disposed under the runway 3 extending along the edge of the aperture.

The locking or fastening devices A3 of the panels consist in this case of eyebolts 87 extending through the supporting plates 77 and coacting in the closed or locking position through their upper, eye-shaped end 88 with the end 89 of the panel roller pins 90. The shank 87 of these eyebolts extend with a certain clearance through an orifice 91 formed centrally of these plates 77 and is secured thereunder by nuts 92 engaging their screwthreaded ends with the interposition of a gaged compression spring 93.

In the locked position shown in FIGURES 5 and 6 the plate 77 is retracted beneath the runway 3, the eyebolt 87 retains by its eye 88 the end 89 of the relevant panel roller pin, the spring 93 providing the tractive force necessary for pressing the panels P on the runway 3. Preferably, the eye 88 of the eyebolt engages a shallow groove 94 formed near the end 89 of pins 90.

As the actuator rod 86 is moved to the right in the direction of the arrow $k$, the transmission sectors 83 pivot in the direction of the arrow $l$, thus causing their arms 78 to pivot upwards and the plates 77 to engage the orifices 95 of runway 3 in which the rollers 2 of panels P are engaged in the locked position. At the same time, the eyebolts 87 are released and may be tilted laterally (see the arrow $m$, FIGURE 6) so as to release the pins of the panel rollers.

As shown in FIGURE 4, it is possible to associate with each roller 2 of the panels P not only a locking device A3 of the type set forth hereinabove, but also notably in the case of panels equipped with a single pair of rollers disposed at one of their ends, locking devices A'3 of the same type as the devices A3 but comprising only an eyebolt such as 87 which is mounted directly on the transmission sector such as 83, the set of devices A'3 being controlled by the same actuator rod 86 as the other devices A3.

As in the case of the other forms of embodiment set forth hereinabove, the actuator rods 86 may be driven through any known and suitable means such as winches, derricks, jacks, etc.

In the modified form of embodiment shown in FIGURES 7 and 8 the retractable bearing or supporting members consist of plates 96 secured for example by welding on sliders-forming supports 97 displaceable vertically across orifices 95 formed in the registering portions of runways 3, this sliding movement being guided by slideways 98 secured under the runways. Lugs 99 secured on the vertical edges and on either face of the slider 97 are disposed straddlewise on the edges of the slideway 98 in order to maintain the slider 97 in the transverse direction in the plane of the slideway. A lower cross-member 100 secured on the slideway 98 acts as a stop for the slider 97 when the latter is in its lowermost position.

The up and downward movements of the slider 97 in its slideway are controlled by means of an actuator rod 101 through the medium of a link 102 and a crankpin 103. The link 102 is pivoted at its lower end by means of a pin 104 on the actuator rod 101, and has its upper end pivotally connected by means of a pin 105 on a fixed wall element 106 secured under the runway 3. On the other hand, the crankpin 103 has its ends pivoted the one at 107 on the link 102 and the other at 108 on the slider 97.

A V-shaped notch 109 is formed in the slider 97 to permit the vertical movement thereof on the pin 105 of link 102.

Preferably, the link 102 and crankpin 103 are mounted on their corresponding supports through the intermediary of rubber pads or silent-blocks having the two fold purpose of taking up plays in the assembly and on the other hand providing a certain tension for the locking device associated with this slider as will be explained presently. Thus, the pin 105 of link 102 is trunnioned in a cylindrical socket or sleeve 110 closed at its ends by a pair of disks 111 and secured on the wall element 106. A pair of rubber rings 112 also acting as silent-blocks are mounted at either end of the socket 110 and surround the pin 105, these resilient rings 112 being held in proper spaced relationship by a distance-piece 113 mounted coaxially with a certain clearance on the pin 105.

Besides the crankpin 103 is fulcrumed through its pins 107 and 108 by means of cylindrical bushings 114, other rubber sleeves or like silent-blocks 115 being interposed between these bushings and the relevant pin.

Associated with the slider 97 is a fixation or locking device A4 consisting of a shackle or like element 116 pivoted at its lower portion on a pin 117 carried by the retractable runway support 96. This shackle 116 engages in its locked position the groove 94 formed in the end portion 89 of the panel roller pin, as in the case of the preceding form of embodiment shown in FIGURES 4 to 6.

This modified device operates as follows:

With the assembly in its locked condition as shown in FIGURES 7 and 8, a tractive effort pulling the actuator rod 101 to the right (see the arrow n) will cause on the one hand the link 102 to rock in the direction of the arrow o and, on the other hand, through the resulting actuation of the crank-pin 103, the slider 97 to move upwards together with the rollers 2 of panel P, until the runway or support plate 96 is flush with the general surface of the runway 3 proper. During the final portion of this movement, the shackle 116 is released from the end 89 of the pin of roller 2. As its pivot pin 117 is slightly shifted with respect to its plane, as clearly shown in FIGURE 8, this shackle 116 will rock by gravity outwards and move to position 116' in which it is shown in dotted lines in FIGURE 8. A rest-forming bead 118 provided along the edge of the orifice 95 receives the shackle in this released position.

The reverse actuation of the rod 101 will cause the slider 97 to move downwards and retract the bearing plate 96. At the same time, the shackle 116 is restored automatically to its upright position due to its engagement with the bead 118, and then engages again the projecting end of the panel roller pin.

Of course, the eyebolt 87 of the locking device of the preceding embodiment may be combined without inconvenience with the slider 97 of this alternate embodiment, and vice-versa, in that the shackle 116 of device A4 may be mounted on the tilting-type retractable bearing member as shown in FIGURES 4 to 6.

The modified form of embodiment shown in FIGURES 9 to 11 constitutes a combination of this character, wherein the shackle 116 of a locking device A4 is associated with a retractable bearing member 96 carried by a vertically displaceable slider 97 similar to the one shown in FIGURES 7 and 8. However, in this combination the vertical movements of the slider are controlled in a different manner. As a matter of fact, the link 102 actuated by means of the rod 101 is fulcrumed by means of a shaft 119 in a bearing 120 secured on a vertical wall element 121. This shaft 119 trunnioned in its bearing 120 by means of bronze bushings or like bearing members 122 carries on its end a crankpin 123 having mounted thereon for loose rotation a roller 124 housed in an orifice 125 of slider 97.

Preferably, this roller is mounted on the crankpin 123 through the medium of rubber rings or silent-blocks 126 adapted, as in the case illustrated in FIGURES 7 and 8, to take up plays and provide a locking tension in the shackle 116 when the assembly is in its locked condition.

It will be readily understood that when the link 102 carried along by the actuator rod 101 in the direction of the arrow p is tilted from the position in which it is shown in FIGURE 9, the device is brought to its lowermost position or locking position as shown in FIGURES 10 and 11.

Considering the modified embodiment shown in FIGURE 12, we see that the eyebolt 87 of a locking device of the A3 type has been combined with a retractable bearing member 96 carried by a slider 97, the latter being controlled by means of an actuator rod 86 through the medium of a link 85 causing the rotation of a transmission sector 83 of the type described in connection with the form of embodiment shown in FIGURES 5 and 6. In this case, the slider 97 carries at its lower portion a pin or stud 127 engageable in an eccentric cam groove or slot 82 of this transmission sector. It will be readily appreciated that from the locking position shown in FIGURE 12 the tilting movement of the link 87 with its sector 83 to the right will cause the upward movement of the slider 97 and therefore the corresponding movement of the roller 2 off its runway so as to release the eyebolt 87.

Of course, this invention should not be construed as being limited to the forms of embodiment shown and described herein by way of example, as many modifications and alterations may be brought thereto without departing from the spirit and scope of the invention as set forth in the appended claims.

What I claim is:

1. A removable fluid-tight closure arrangement for horizontal rectangular openings in travelling and stationary enclosed spaces such as hatchways in ship decks, roof apertures in open-top buildings and vehicles, comprising at least one movable cover panel made of a plurality of adjoining separate rolling panel sections fitted with pairs of lateral wheels, fixed continuous runways provided along two opposite parallel edges of said opening for supporting and guiding said panel sections, a continuous upward facing fixed panel seat provided along the edges of said opening, a continuous sealing member provided along the edges of said panel sections in registering relationship with said seat, said panel sections being adapted to cover and to uncover said opening by rolling on said runways and to be lowered in their closing position to rest on said seat which is thereby engaged by said sealing member to form a tight joint therebetween and to be raised away from engagement with said seat to release said joint preparatory to removing said panel sections, apertures in said runways respectively located under said wheels of said panel sections in the closing position thereof, a plurality of rocking lever means pivotally mounted beneath said runways and provided each one with a pair of arm members the free ends of which are formed the one with a platform means cooperating with a panel wheel and the other with a locking hook means fixedly attached to said platform, said platform means being adapted to support, when lifted on a level with said runways, said wheels respectively in the covering raised position of said panel sections thereby filling out said apertures and to cause said wheels to be lowered through said apertures until engagement of said panel sections with said seat when said platform means are depressed, unitary actuating linkage means extending sidewise along and beneath said runways and operatively connected to said rocking lever means in movable relationship therewith for simultaneously controlling the same, and laterally projecting dog-like keeper elements provided on the sides of said panel sections and extending above said runways and adapted to be engaged by said hook means in their locking position to retain said panel sections tightly on their seat in their closed lowered position while pressing them downwards.

2. A removable fluid-tight closure arrangement for horizontal rectangular openings in travelling and stationary enclosed spaces such as hatchways in ship decks, roof apertures in open-top buildings and vehicles, comprising at least one movable cover panel made of a plurality of adjoining separate rolling panel sections fitted with pairs of lateral wheels, fixed continuous runways provided along two opposite parallel edges of said opening for supporting and guiding said panel sections, a continuous upward facing fixed panel seat provided along the edges of said opening, a continuous sealing member provided along the edges of said panel sections in registering relationship with said seat, said panel sections being adapted to cover and to uncover said opening by rolling on said runways and to be lowered in their closing position to rest on said seat which is thereby engaged by said sealing member to form a tight joint therebetween and to be raised away from engagement with said seat to release said joint preparatory to removing said panel sections, apertures in said runways respectively located under said wheels of said panel sections in the closing position thereof, a plurality of rocking lever means pivotally mounted beneath said runways and provided each one with a pair of arm members the free ends of which are formed the one with a platform means cooperating with a panel wheel and the other with a locking hook means fixedly attached to said platform, said platform means being adapted to support, when lifted on a level with said runways, said wheels respectively in the covering raised position of said panel sections thereby filling out said apertures and to cause said wheels to be lowered through said apertures until engagement of said panel sections with said seat when said platform means are depressed, unitary actuating linkage means extending sidewise along and beneath said runways and operatively connected to said rocking lever means in movable relationship therewith for simultaneously controlling the same, orifices disposed above each of said pivoting lever means besides said apertures to serve for the passage of said locking hooks when the locking movement takes place, and laterally projecting dog-like keeper elements provided on the sides of said panel sections and extending above said runways and adapted to be engaged by said hook means in their locking position to retain said panel sections tightly on their seat in their closed lowered position while pressing them downwards.

3. A removable fluid-tight closure arrangement for horizontal rectangular openings in travelling and stationary enclosed spaces such as hatchways in ship decks, roof apertures in open-top buildings and vehicles, comprising at least one movable cover panel made of a plurality of adjoining separate rolling panel sections fitted with pairs of lateral wheels, fixed continuous runways provided along two opposite parallel edges of said opening for supporting and guiding said panel sections, a continuous upward facing fixed panel seat provided along the edges of said opening, a continuous sealing member provided along the edges of said panel sections in registering relationship with said seat, said panel sections being adapted to cover and to uncover said opening by rolling on said runways and to be lowered in their closing position to rest on said seat which is thereby engaged by said sealing member to form a tight joint therebetween and to be raised away from engagement with said seat to release said joint preparatory to removing said panel sections, apertures in said runways respectively located under said wheels of said panel sections in the closing position thereof, rocking lever means pivotally mounted beneath said runways and provided each one with a pair of arm members the free ends of which are formed the one with a platform means cooperating with a panel wheel and the other with a locking hook means fixedly attached to said platform, said platform means being adapted to support, when lifted on a level with said runways, said wheels respectively in the covering raised position of said panel sections thereby filling out said apertures and to cause said wheels to be lowered through said apertures until engagement of said panel sections with said seat when said platform means are depressed, unitary actuating linkage means extending sidewise along and beneath said runways and operatively connected to said rocking lever means in movable relationship therewith for simultaneously controlling the same, a plurality of orifices disposed above each of said pivoting lever means besides said apertures to serve for the passage of said locking hooks when the locking movement takes place, laterally projecting dog-like keeper elements provided on the sides of said panel sections and extending above said runways and adapted to be engaged by said hook means in their locking position to retain said panel sections tightly on their seat in their closed lowered position while pressing them downwards, and laterally protruding structural elements on said panel sections and fixed stopping projections on said runways to cooperate with said structural elements for preventing any undesired shifting of said panel sections in a direction parallel to said runways during the locking operation.

4. A removable fluid-tight closure arrangement for horizontal rectangular openings in travelling and stationary enclosed spaces such as hatchways in ship decks, roof apertures in open-top buildings and vehicles, comprising at least one movable cover panel made of a plurality of adjoining separate rolling panel sections fitted with pairs of lateral wheels, fixed continuous runways provided along two opposite parallel edges of said opening for supporting and guiding said panel sections, a continuous upward facing fixed panel seat provided along the edges of said opening, a continuous sealing member provided along the edges of said panel sections in registering relationship with said seat, said panel sections being adapted to cover and to uncover said opening by rolling on said runways and to be lowered in their closing position to rest on said seat which is thereby engaged by said sealing member to form a tight joint therebetween and to be raised away from engagement with said seat to release said joint preparatory to removing said panel sections, apertures in said runways respectively located under said wheels of said panel sections in the closing position thereof, a plurality of rocking lever means pivotally mounted beneath said runways and provided each one with a pair of arm members the free ends of which are formed the one with a platform means cooperating with a panel wheel and the other with a locking hook means fixedly attached to said platform, said platform means being adapted to support, when lifted on a level with said runways, said wheels respectively in the covering raised position of said panel sections thereby filling out said apertures and to cause said wheels to be lowered through said apertures until engagement of said panel sections with said seat when said platform means are depressed, unitary actuating linkage means extending sidewise along and beneath said runways and operatively connected to said rocking lever means in movable relationship therewith for simultaneously controlling the same, orifices disposed above each of said pivoting lever means besides said apertures to serve for the passage of said locking hooks when the locking movement takes place, laterally projecting dog-like keeper elements provided on the sides of said panel sections and extending above said runways and adapted to be engaged by said hook means in their locking position to retain said panel sections tightly on their seat in their closed lowered position while pressing them downwards, and fixed stopping projections on said runways, made of upward protruding abutments provided between each said aperture and its associated aforesaid orifice respectively to cooperate with said keeper elements bearing thereagainst for preventing any undesired shifting of said panel sections in a direction parallel to said runways during the locking operation.

5. A removable fluid-tight closure arrangement for horizontal rectangular openings in travelling and stationary enclosed spaces such as hatchways in ship decks, roof apertures in open-top buildings and vehicles, comprising at least one movable cover panel made of a plurality of adjoining separate rolling panel sections fitted with pairs of lateral wheels, fixed continuous runways provided along two opposite parallel edges of said opening for supporting and guiding said panel sections, a continuous upward facing fixed panel seat provided along the edges of said opening, a continuous sealing member provided along the edges of said panel sections in registering relationship with said seat, said panel sections being adapted to cover and to uncover said opening by rolling on said runways and to be lowered in their closing position to rest on said seat which is thereby engaged by said sealing member to form a tight joint therebetween and to be raised away from engagement with said seat to release said joint preparatory to removing said panel sections, apertures in said runways respectively located under said wheels of said panel sections in the closing position thereof, a plurality of rocking lever means pivotally mounted beneath said runways and formed each one on the one hand with a lower lug and on the other hand with a pair of arm members the free ends of which are formed the one with a platform means cooperating with a panel wheel and the other with a locking hook means fixedly attached to said platform, said platform means being adapted to support, when lifted on a level with said runways, said wheels respectively in the covering raised position of said panel sections thereby filling out said apertures until engagement of said panel sections with said seat when said platform means are depressed, integral actuating bar means extending sidewise along and beneath said runways and operatively interconnecting through hinged connections with said lower lugs all of said pivoting lever means disposed along a same edge of the opening to be closed for simultaneously controlling the same, and laterally projecting dog-like keeper elements provided on the sides of said panel sections and extending above said runways and adapted to be engaged by said hook means in their locking position to retain said panel sections tightly on their seat in their closed lowered position while pressing them downwards.

6. A removable fluid-tight closure arrangement for horizontal rectangular openings in travelling and stationary enclosed spaces such as hatchways in ship decks, roof apertures in open-top buildings and vehicles, comprising at least one movable cover panel made of a plurality of adjoining separate rolling panel sections fitted with pairs of lateral wheels, fixed continuous runways provided along two opposite parallel edges of said opening for supporting and guiding said panel sections, a continuous upward facing fixed panel seat provided along the edges of said opening, a continuous sealing member provided along the edges of said panel sections in registering relationship with said seat, said panel sections being adapted to cover and to uncover said opening by rolling on said runways and to be lowered in their closing position to rest on said seat which is thereby engaged by said sealing member to form a tight joint therebetween and to be raised away from engagement with said seat to release said joint preparatory to removing said panel sections, apertures in said runways respectively located under said wheels of said panel sections in the closing position thereof, a plurality of rocking lever means pivotally mounted beneath said runways and formed each one on the one hand with a lower lug and on the other hand with a pair of arm members the free ends of which are formed the one with a platform means cooperating with a panel wheel and the other with a locking hook means fixedly attached to said platform, said platform means being adapted to support, when lifted on a level with said runways, said wheels respectively in the covering raised position of said panel sections thereby filling out said apertures and to cause said wheels to be lowered through said apertures until engagement of said panel sections with said seat when said platform means are depressed, integral actuating bar means extending sidewise along and beneath said runways and operatively interconnecting through hinged connections with said lower lugs all of said pivoting lever means disposed along a same edge of the opening to be closed, fixed power rams constituted by two jack means acting in opposite directions on said actuating bar and respectively coupled by means of a hinged connection with the two pivoting lever means disposed at both ends of the corresponding runway for simultaneously controlling the same, and laterally projecting dog-like keeper elements provided on the sides of said panel sections and extending above said runways and adapted to be engaged by said hook means in their locking position to retain said panel sections tightly on their seat in their closed lowered position while pressing them downwards.

7. In a movable closing device having multiple panels for open-top spaces having panel runways provided along edges of said space and sealing means adjacent said runways onto which said panels may be lowered for effecting sealing joints and from which they may be elevated to open the sealing joints, said panels having rollers movable over said runways and said runways having orifices into which said rollers may descend for lowering of the panels, pivoted members having surfaces movable upwardly and downwardly in said orifices and engageable by said rollers for elevating and lowering the panels relative to said sealing means, locking hook means integral with said pivoted members and fixedly attached to said surfaces and pivotally movable therewith through additional orifices in said runways into locking and unlocking positions, means associated with said panel members and engaged by said locking hook means when said panels are in their lowered positions to lock the latter on said sealing means, and means for moving said pivoted members and said locking hook means in unison.

8. In a movable closing device having multiple panels for open top spaces having panel runways provided along edges of said spaces and sealing means adjacent said runways onto which said panels may be lowered for effecting sealing joints and from which they may be elevated to open the sealing joints, said panels having rollers movable over said runways and said runways having orifices into which said rollers may descend for lowering of the panels, pivoted multi-armed lever members supported from the runways, one arm of each of the lever members having a surface movable upwardly and downwardly in one of said orifices and engageable by one of said rollers for elevating and lowering the panels relative to said sealing means, a hook-shaped locking lug on another arm of each of the pivoted lever members fixedly attached to said surface and pivotally movable therewith through additional orifices in said runways adjacent the first-named orifices into locking and unlocking positions, locking catch members associated with said panel members and each engaged by said locking lug when said panels are in their lowered positions to lock the latter on said sealing means, fixed projections on said runways engageable with said locking catch members to prevent displacement of the panels in a direction parallel to said runways when the panels are lowered, additional lever arms on said lever members, a bar interconnecting all said additional lever arms and common means for moving said lever members and said locking lugs in unison.

9. In a movable closing device having multiple panels for open top spaces having panel runways provided along edges of said spaces and sealing means adjacent said runways onto which said panels may be lowered for effecting sealing joints and from which they may be elevated to open the sealing joints, said panels having rollers movable over said runways and said runways having orifices into which said rollers may descend for lowering of the panels, pivoted multi-armed lever members supported from the runways, one arm of each of the lever members having a surface movable upwardly and downwardly in one of said orifices and engageable by one of said rollers for elevating and lowering the panels relative to said sealing means, a hook-shaped locking lug on another arm of each of the pivoted lever members fixedly attached to said surface and pivotally movable therewith through additional orifices in said runways adjacent the first-named orifices into locking and unlocking positions, locking catch members associated with said panel members and each engaged by said locking lug when said panels are in their lowered positions to lock the latter on said sealing means, fixed projections on said runways engageable with said locking catch members to prevent displacement of the panels in a direction parallel to said runways when the panels are lowered, additional lever arms on said lever members, a bar pivotally connected to all said additional lever arms, and a jack at each end of said bar, said jacks acting in opposite directions to actuate said bar for moving said lever members and locking lugs in unison.

10. In a movable closing device having multiple panels for open-top spaces having panel runways provided along edges of said spaces and sealing means adjacent said runways onto which said panels may be lowered for effecting sealing joints and from which they may be elevated to open the sealing joints, said panels having rollers movable over said runways and said runways having orifices into which said rollers may descend for lowering of the panels, retractable bearing members having platform surfaces integral therewith and movable upwards and downwards in said orifices and engageable by said rollers for lifting and lowering said panels relative to said sealing means, common actuating linkage means operatively connected to all of said bearing members provided along a same edge of said space for moving same in unison, locking means directly connected to said surfaces to which they are effectively attached for movement therewith into locking and unlocking positions, and catch means connected to said panels and engaged by said locking means when said panels are in their lowered positions to lock the latter on said sealing means.

11. Arrangement according to claim 10 comprising pivoting arm means fulcrumed at one end thereof beneath said runways to form said retractable bearing members and carrying a pin follower at their opposite ends, whereas said surfaces integral therewith are constituted by their intermediate portions formed with a hole therein, said panel rollers are provided with projecting roller axle pin ends which form said catch means, locking means as aforesaid consisting for each one of said platform surfaces of an eye-bolt having a shank extending with a side clearance through said hole provided in said platform surface and being secured thereunder by nut means with interposition of a compression spring, said shank being formed with an upper ring-like end adapted to engage in its lower locking position said projecting roller axle pin end, said common actuating linkage means comprising pivoting bell-crank lever means fulcrumed beneath said runways and formed with an arcuate eccentric cam slot engaged by said pin follower, unitary substantially horizontal bar means forming said actuating means extending beneath each of said runways and pivotally connected to all of said bell-crank levers provided along a same edge of said space.

12. An arrangement according to claim 10 wherein said wheels, apertures and bearing members are provided with vertical slideways under said runways close to said apertures, vertically reciprocable slide blocks forming said bearing members and slidably mounted in said slideways to be guided thereby, said platform surfaces being integral with the top ends of said blocks, sidewise projecting axle pin ends provided on said wheels to form said catch means, shackle means forming said locking means and hingedly connected to said platform surfaces whereby they may tilt laterally so as to engage or to be disengaged from said axle pin end, said shackle means being disposed against the outer edge of each said aperture and at such a level that during the downward retraction of said platform surface, it abuts against said edge and is thereby automatically moved to an upright locking position, unitary bar means forming said actuating means extending along and beneath each of said runways and hingedly connected through link means to said slide blocks.

13. An arrangement according to claim 12 wherein each of said link means comprises a connecting lever pivoted by its ends on the one hand on said actuating bar and on the other hand on a fixed fulcrum point respectively, and a crank-pin forming link pivoted by its ends on the one hand on said lever and on the other hand on said slide block.

14. An arrangement according to claim 13 wherein at least one panel section and a seat are provided and wherein said levers and crank-pin links are journalled in bearings by means of force-fitted bushings of resiliently deformable material for taking up any play and for providing a spring force pressing said panel section on said seat in the panel locking position.

15. An arrangement according to claim 12 wherein each of said link means comprises a pivoting crank-lever journalled in the edge of said opening and carrying an eccentric crank-pin substantially freely trunnioned in an orifice of the relevant slide block, said crank-pin being trunnioned by means of a bushing of resiliently deformable material.

16. An arrangement according to claim 10 wherein said wheels, apertures and bearing members are provided with vertical slide-ways under said runways close to said apertures, vertically reciprocable slide blocks forming said bearing members and slidably mounted in said slideways to be guided thereby, said platform surfaces being integral with the top ends of said blocks and being formed each one with a hole and said blocks carrying at their lower portion a pin follower, sidewise projecting axle pin ends provided on said wheels to form said catch means, locking means as aforesaid consisting for each one of said platform surfaces of an eye-bolt having a shank extending with a side clearance through said hole provided in said platform surface and being secured thereunder by nut means with interposition of a compression spring, said shank being formed with an upper ring-like end adapted to engage in its lower locking position said projecting wheel axle pin end, said common actuating linkage means comprising pivoting bell-crank lever means fulcrumed beneath said runways and formed with an arcuate eccentric cam slot engaged by said pin follower, unitary substantially horizontal bar means forming said actuating means extending beneath each of said runways and pivotally connected to all of said bell-crank levers provided along a same edge of said space.

References Cited in the file of this patent

UNITED STATES PATENTS

| | | |
|---|---|---|
| 2,707,928 | Farrell | May 10, 1955 |
| 2,716,262 | Oswald | Aug. 30, 1955 |
| 2,771,136 | Lecomte | Nov. 20, 1956 |

FOREIGN PATENTS

| | | |
|---|---|---|
| 1,022,796 | France | Dec. 17, 1952 |
| 808,110 | Great Britain | Jan. 28, 1959 |